Patented Nov. 30, 1937

2,100,968

UNITED STATES PATENT OFFICE 2,100,968

MANUFACTURE OF ORGANIC SULPHUR COMPOUNDS

Leon Lilienfeld, Vienna, Austria

No Drawing. Application March 8, 1932, Serial No. 597,641. In Great Britain March 31, 1931

39 Claims. (Cl. 260—151)

In my U. S. Patent No. 1,018,329 a process is described by which, by subjecting dichlorhydrin to the action of a stoichiometric quantity or of an excess of an inorganic sulphide, sulphur derivatives free from halogen are obtained.

Furthermore, in his papers on the sulphur analogues of glycerine (Liebig's Annalen Vol. 122, page 71 and the following pages and Vol. 124, page 221 and the following pages) Carius describes the di- and tri-thioglycerines and the process for making them, which process consists in acting with an excess of potassium sulphydrate in alcoholic solution on di- or tri-chlorhydrin respectively, the final products being free from chlorine.

Now, I have found that valuable poly-substituted aliphatic organic compounds in which substituents are attached to a plurality of carbon atoms, (which may or may not contain one or more free hydroxyl groups) containing at least one sulphur atom and at least one halogen atom are obtained when poly-halogen derivatives (which products may or may not contain one or more free hydroxyl groups, or one or more other atoms or groups, for example nitrogen atoms or one or more groups containing nitrogen or oxygen and so on) are acted upon with such amounts of inorganic sulphides or sulphydrates, preferably alkali sulphides or alkali sulphydrates, as are substantially below the stoichiometric proportion. When inorganic sulphides are allowed to act upon the poly-halogen derivatives in the amounts here stated, derivatives containing sulphur and halogen (which may or may not contain one or more free hydroxyl groups) are obtained according to the present process, and when inorganic sulphydrates are allowed to act upon the poly-halogen derivatives, halogen sulphur organic derivatives (which may or may not contain one or more free hydroxyl groups) are obtained according to the present process.

Sulphides and sulphydrates can be referred to generically as "sulphide compounds". These compounds can also be referred to as a "non-oxidized compound of sulphur". The sulphur in such compounds can be termed "sulphide sulphur", as distinguished from sulphur in such radicals as HSO₃ or SO₄ which contain oxygen, and the expression "an unoxidized sulphur atom" means a sulphur atom to which no oxygen is directly combined.

The reaction may take place in aqueous or alcoholic solution.

The products of the invention are valuable reagents for synthetic reactions and are also contemplated for medicinal purposes.

The following examples of operation serve as a practical illustration of the invention, which, however, is in no way limited to the examples; the parts are by weight:—

Example 1

930 parts of an aqueous solution of crystallized sodium sulphide ($Na_2S.9H_2O$) of 50 per cent. strength are allowed to flow in a thin stream into 1000 parts of α-dichlorhydrin while continually stirring. The incorporation of the sodium sulphide solution with the α-dichlorhydrin may take about half-an-hour, during which time the temperature of the reaction mixture gradually rises from room temperature to 60 to 70° C. (The larger the amounts of the initial materials, the greater is the rise in temperature.) After the total amount of the sodium sulphide solution has been introduced into the α-dichlorhydrin, the stirring of the reaction mixture is continued for another 6 to 8 hours, during which time the mixture may cool to room temperature. The reaction mixture is now allowed to stand over night at room temperature, during which time the product of the reaction settles at the bottom of the vessel in the form of an almost clear, almost colourless, viscous, oily substance. It is now separated from the mother liquor either, for example, in a separating funnel, or by decanting or siphoning the mother liquor.

If desired, the product of the reaction may be purified or separated into its constituents respectively, by one of the following methods:—

First method

The crude product of the reaction is washed with carbon tetrachloride until the carbon tetrachloride does not absorb any considerable amount of such constituents of the product of the reaction as are soluble in carbon tetrachloride. This washing operation may take place while shaking or stirring in a separating funnel or in a centrifuge or in a vessel furnished with a stirrer. During the washing operation, the carbon-tetrachloride with materials in solution, may be separated from the part of the reaction product insoluble in carbon tetrachloride and replaced by an appropriate fresh quantity of carbon tetrachloride. After the washing operation, the carbon tetrachloride is separated from the oily viscous constituent of the reaction that is insoluble in carbon tetrachloride, and the latter product may then be freed from carbon tetrachloride by evaporating the latter, under pressure below atmospheric.

Second method

Either the crude product of the reaction or the product already purified by washing with carbon tetrachloride is dissolved in alcohol and the clear solution precipitated by adding a great excess of carbon tetrachloride. In the beginning a milky emulsion forms which however after some time separates into two layers, the upper layer being the precipitated constituent of the product of the reaction. After having been separated, this oily substance is freed from the carbon tetrachloride adhering to it, by evaporating the latter in a vacuum.

Third method

The crude reaction product is subjected to distillation under reduced pressure (e. g. while at an absolute pressure of about 742 to 745 m. m.) and the distillation conducted in such a manner that the distilling temperature does not exceed 92° C. The distillation is stopped as soon as this temperature is reached. The part of the distillate which distills between 70 and 90° C. is collected separately. The residue of the distillation (i. e. the part which does not distill over) is a clear, viscous, oily body.

Fourth method

The mode of procedure is as in the third method, but with the difference that the distillation is conducted in such a manner that the temperature reaches 110° C. and that the distillation is stopped as soon as this temperature is reached. The part which distills between 90 and 110° C. is separately collected. The residue of the distillation is a faintly coloured, clear viscous body. Both of the fractions can be used, and both contain organically combined sulphur and halogen.

Fifth method

The mode of procedure is as in the third method, but with the difference that the distillation is conducted in such a manner that the temperature reaches 125° C. and that the distillation is stopped as soon as this temperature is reached. The part which distills between 110 and 125° C. is separately collected. The residue of the distillation is a brownish clear viscous body.

Sixth method

The mode of procedure is as in the third method, but with the difference that the distillation is conducted in such a manner that the temperature reaches 150° C. and that the distillation is stopped as soon as this temperature is reached. The part which distills between 125 and 150° C. is separately collected. The residue of the distillation is a dark, but clear, viscous body.

Seventh method

The product obtained in the fourth method (i. e. the distillation residue) is kneaded with ether until, on evaporation, a portion of the ether does not leave behind any residue.

The ether insoluble residue of the ether extraction is freed from the adhering ether in a vacuum at 20–30° C.

The final product (i. e. the portion which does not dissolve in ether, and does not distill with the ether) is a brownish, clear, viscous honey-like mass.

On evaporation of the ether, the ether extracts leave behind a clear, brownish, viscous oil.

Example 2

1860 parts of an aqueous solution of crystallized sodium sulphide ($Na_2S.9H_2O$) of 50 per cent. strength are allowed to flow as a thin stream into 1000 parts of α-dichlorhydrin while continually stirring. The incorporation of the sodium sulphide solution with the α-dichlorhydrin may take about two hours and a half, during which time the temperature of the reaction mixture gradually rises from room temperature to 60 to 70° C.

(The larger the amounts of the initial materials, the greater is the rise in temperature.) After the total amount of the sodium sulphide solution has been introduced into the α-dichlorhydrin, the stirring of the reaction mixture is continued for another 6 to 8 hours, during which time the mixture may cool to room temperature. The reaction mixture is now allowed to stand over night at room temperature, by which time the product of the reaction will have settled at the bottom of the vessel in the form of an almost clear, almost colourless, viscous, oily substance. It is now separated from the mother liquor either by the use of a separating funnel, or by decanting or by siphoning the mother liquor.

The crude product of the reaction consists of two products, one of which is soluble, the other insoluble in ether. Consequently, the crude product of the reaction can be separated into these two constituents by being extracted with ether while shaking, stirring or the like. The ether dissolves the ether-soluble constituent and leaves the ether-insoluble constituent undissolved.

To isolate the ether-soluble part of the product of the reaction from its solution in ether, the latter, preferably after being freed from at least part of the ether by distilling the latter, is precipitated with carbon tetrachloride, whereupon, if desired, it may be washed once or several times with carbon tetrachloride while shaking, stirring or the like, to remove impurities soluble therein. After being freed from the ether and/or carbon tetrachloride by evaporation under reduced pressure, the ether-soluble constituent of the product of the reaction is a clear, oily substance.

The ether-insoluble part of the product of the reaction, after being freed from the ether adhering to it by evaporating the ether, preferably under reduced pressure, is a viscous, clear, honey-like substance.

Example 3

1000 parts of α-dichlorhydrin are mixed with 640 parts of alcohol of 95 per cent. strength and heated with reflux. As soon as the solution of α-dichlorhydrin in alcohol starts boiling, a solution of 466 parts of $Na_2S.9H_2O$ in about 2000 parts of alcohol of 95 per cent. strength, preheated to about 80° C. is added to the alcoholic dichlorhydrin solution in small portions, the time taken up by the addition of the whole amount of the sodium sulphide solution being about half an hour. The heating with reflux is continued for another 1 to 2 hours, whereupon the reaction mass is allowed to cool. It is a clear, almost colourless liquid standing above a crystalline layer (NaCl). The alcoholic mother liquor is now freed from the sodium chloride by filtration, decantation or the like, and the alcohol evaporated under reduced pressure. The residue is a yellowish, clear, moderately viscous, oily substance.

Example 4

The process is conducted as in Example 3, but with the difference that, instead of 466 parts of sodium sulphide dissolved in 2000 parts of alcohol, 932 parts of sodium sulphide dissolved in 4000 parts of alcohol are employed. The final product is a yellowish, clear, viscous, oily substance.

Example 5

A mixture of 1000 parts of α-dichlorhydrin and 770 parts of alcohol of 95 per cent. strength is heated with reflux until it boils, whereupon a solution of 554 parts of potassium sulphydrate in 1850 parts of alcohol of 95 per cent. strength is added in small portions. The addition of the whole amount of the potassium sulphydrate solution may take about one hour to one hour and a half, whereupon the reaction mixture is boiled with reflux for another one to two hours. After being cooled to room temperature, the reaction mixture is freed from the potassium chloride by filtering or centrifuging or the like and the alcohol and water contained in the filtrate evaporated under reduced pressure. The residue is a clear, viscous oil having an unpleasant smell.

When the alpha dichlorohydrine reacts with sodium hydrosulphide, in the proportions herein indicated, i. e. using less than the stoichiometric equivalent of the said hydrosulphide, the simplest reaction that can take place would be

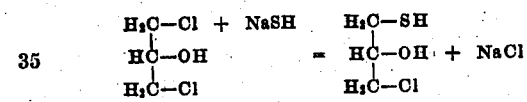

This could be written

Ha representing a halogen.

When alpha dichlorohydrine reacts with sodium sulphide, a series of compounds may be formed, depending upon the exact proportions. The following formulas are believed to truly represent the structure of some of these bodies:—

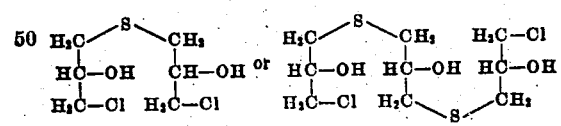

or

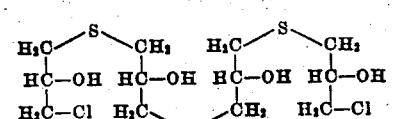

etc.

Similarly beta dichlorohydrin would react with sodium sulphide to give bodies probably having the structure:—

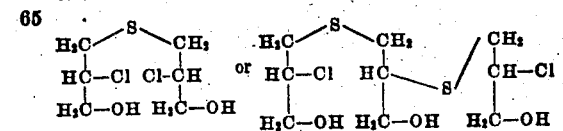

etc.

These bodies can be generically expressed by the formula $(C_3H_5OH)_nS_{n-1}Cl_2$ ("$n$" here being 2, 3 or 4). Here also Cl is one specific case of Ha (halogen).

Example 6

A solution of 1630 parts of crystallized sodium sulphide ($Na_2S.9H_2O$) in 2450 parts of alcohol of 95 per cent. strength is heated with reflux to the boiling point, and 1000 parts of trichlorhydrin are allowed, drop by drop, to flow into the boiling sodium sulphide solution. Time of addition of the trichlorhydrin 3 to 4 hours. After this time, the reaction mixture is kept boiling for another 2 to 3 hours. Thereafter the reaction mixture is allowed to cool in the water bath and is then a turbid brownish liquid standing over a moderately large amount of a brownish oily substance interspersed with sodium chloride crystals. This is an illustration of treating a body not containing an —OH group.

25000 parts of aqueous sodium chloride solution of 10 per cent. strength are added to the reaction mixture while stirring or shaking, and the reaction mixture thus obtained is allowed to stand for 1 to 2 days. During this time, the milky mixture becomes clear or almost clear, and a considerable amount of an oily substance settles on the bottom of the vessel. This oily substance is separated from the clear aqueous liquid by decantation of the latter. The crude, oily substance is a yellowish, turbid, viscous, oily body. This oil is now distilled under reduced pressure (15 to 18 mm.) and the fraction going over between 65 to 110° C. and the fraction going over between 110 and 140° C. are separately collected.

Another way of purifying the crude product is the following:

The crude reaction mixture is introduced into about 13000 parts of cold water and stirred or shaken therewith. Thereafter, the milky mixture is shaken with ether, during which procedure a very consistent greyish mass separates. The ether solution is separated from the consistent mass and both parts are worked up as follows:—

The consistent mass

It is kneaded with water until the wash water after use is free from chlorine, whereupon it is kneaded several times with alcohol and finally dried under reduced pressure. The final product is a very consistent, clear, greyish, transparent mass, having a consistency similar to that of Venice turpentine.

Ether solution

The ether solution is washed with water until the washing water does not contain any chlorine, whereupon the ether is separated from the washing water and distilled. The oily residue is dried at reduced pressure. The dried oily substance is now several times extracted with alcohol. Only part of the substance goes into solution, and the constituent which is insoluble in alcohol is freed from alcohol by drying at reduced pressure.

The alcoholic extracts are freed from alcohol by distilling the latter at reduced pressure.

In the foregoing examples, instead of the α-dichlorhydrin, β-dichlorhydrin may be used.

In the foregoing examples, where desired or expedient, instead of the chlorine derivatives the equivalent quantities of bromine or iodine derivatives may be used.

I have referred to forming sulphur compounds by reacting with sulphides or sulphydrates (hydrosulphides).

Instead of the halogen derivatives used in the foregoing examples, other di- or poly-halogen derivatives can be employed, for instance alkylene halides, such as ethylene chloride or propylene chloride or trimethylene bromide, or cetene-dibromide, or α-α-dichloro-propylene, or α-γ-dichloro-propylene (β-epidichlorhydrin), or β-γ-dichloro-propylene (α-epidichlorhydrin), or allylene-dichloride, or 2:2-dichloroethanol (dichloro-ethyl alcohol), or ethyl-β-γ-dibromopropyl ether, or β-γ-dibromo-allylalcohol, or 1:2-dibromopentanone, or 2:4-dibromopentanone, or trichloro-ethane, or ethyl-α-β-dichloro-vinyl ether, or dichloro-ether, or N-(β-γ-dibromopropyl)-urea, or dimethyl (β-γ-dibromo-propyl) amine.

In the appended claims, the prefix "poly-" is used to designate "at least two", although I am aware that many writers have used this prefix to signify "more than two". I use the term "polyhalogen derivatives" to include both the dihalogen derivatives and derivatives containing more than two halogen atoms, in order to avoid the use of alternative expressions. The halogen derivatives contain the halogen atoms substituted in an aliphatic chain (as distinguished from dichlorbenzol and its homologues).

The type reactions and chemical formulas as given in this specification, I believe, (based upon much research work) truly represent the reactions and formulas of bodies produced in certain of the examples, but I do not wish to be limited, in the scope of the claims, to the absolute accuracy of these.

What I claim is:—

1. Process for the manufacture of organic compounds containing a sulphur atom and a halogen atom in an aliphatic chain, which comprises reacting upon an organic body containing a plurality of halogen atoms linked to carbon in an aliphatic chain, to which carbon, hydrogen is also linked, with an inorganic sulphide compound, the amount of the latter being substantially below the stoichiometric proportion with respect to the halogen atoms present in said aliphatic chain.

2. Process for the manufacture of aliphatic organic compounds which contain a hydroxyl group, at least one atom of sulphur and at least one halogen atom, wherein a polyhalogenated aliphatic compound containing at least one hydroxyl group is acted upon with such an amount of an inorganic non-oxidized metal compound of sulphur as is substantially below the stoichiometric proportion.

3. A process for the manufacture of organic compounds which compounds contain at least one sulphur atom and at least one halogen atom, which comprises reacting upon an aliphatic compound containing a plurality of halogen atoms bonded to carbon to which carbon hydrogen is also bonded, with an amount of a metal sulphide compound substantially less than stoichiometrically equivalent to said plurality of halogen atoms.

4. A process for the manufacture of organic compounds which compounds contain at least one sulphur atom and at least one halogen atom, which comprises reacting upon a halohydrin containing more than one halogen atom, with substantially less than the stoichiometrically equivalent amount of a metal sulphide compound.

5. Process for the manufacture of organic compounds free from hydroxyl groups, which compounds contain at least one atom of sulphur and at least one halogen atom, wherein an aliphatic compound containing a plurality of halogen atoms bonded to carbon to which hydrogen is also bonded, which compound is free from hydroxyl groups is acted upon with such an amount of an inorganic non-oxidized metal compound of sulphur as is substantially below the stoichiometric proportion.

6. A process which comprises reacting upon a glycerine dichlorohydrine with less than the stoichiometric equivalent of an inorganic sulphide compound.

7. A process which comprises reacting upon a glycerine dichlorohydrine with substantially less than the stoichiometric equivalent of a soluble metal sulphide compound.

8. A process which comprises reacting upon alpha-dichlorohydrine with substantially less than the stoichiometric equivalent of an inorganic sulphide compound.

9. A process as claimed in claim 1, wherein the organic body also contains combined nitrogen in its molecule in a stable combination.

10. A process as claimed in claim 1, wherein the organic body also contains in its molecule, combined oxygen in a stable combination, other than any oxygen contained in hydroxyl groups.

11. A process as claimed in claim 1, wherein the reaction is carried out in the presence of an aliphatic alcohol, as a solvent.

12. A process as claimed in claim 1, wherein the reaction is carried out in the presence of water.

13. A process of making organic compounds containing a poly-valent organic radical and containing at least one atom of sulphur and at least one halogen atom, which comprises reacting upon a polyhalogen hydroxy organic derivative in which such halogenation is in an aliphatic chain, with an inorganic non-oxidized compound containing sulphur and a metal, said non-oxidized compound being in amount substantially below the stoichiometric proportion.

14. A process which comprises adding a solution of alkali metal sulphide in water to an amount of a glycerine dichlorohydrine substantially exceeding the stoichiometric equivalent to the total amount of the alkali metal sulphide contained in the said solution, and separating the viscous sulphur-containing reaction product.

15. A process which comprises slowly adding trichlorhydrin to a solution of alkali metal sulphide in alcohol, while said solution is kept hot, continuing to keep the solution hot for several hours, and separating the viscous sulphur-containing reaction product.

16. A process which comprises reacting upon a glycerine dihalogenhydrin with less than the stoichiometric equivalent of a sulphide compound of a metal.

17. A process which comprises reacting upon a glycerine alpha-dihalogenhydrin with less than the stoichiometric equivalent of an inorganic sulphide compound.

18. A process which comprises contacting a solution of alkali metal sulphide with an amount of a glycerine dihalogenhydrin substantially exceeding the stoichiometric equivalent to the total amount of the alkali metal sulphide contained in the said solution, and separating the viscous sulphur-containing reaction product.

19. A process which comprises contacting a solution of alkali metal hydrosulphide with an amount of a glycerine dihalogenhydrin substantially exceeding the stoichiometric equivalent to the total amount of the alkali metal hydrosulphide contained in the said solution, and separating the viscous sulphur-containing reaction product.

20. An organic compound, soluble in alcohol and insoluble in carbon tetrachloride, containing in an aliphatic chain, an unoxidized sulphur atom attached to a carbon atom, halogen attached to another carbon atom, and hydroxyl attached to still another carbon atom.

21. An organic compound, soluble in alcohol and insoluble in carbon tetrachloride, containing in an aliphatic chain, an —SH group attached to a carbon atom, halogen attached to another carbon atom, and hydroxyl attached to still another carbon atom.

22. An organic compound which is a reaction product of a halogenhydrin containing a plurality of halogen atoms with an inorganic sulphide compound, which product is stable, is soluble in alcohol, and is insoluble in carbontetrachloride, and which product contains in an aliphatic chain, —SH attached to a carbon atom and halogen attached to another carbon atom.

23. An organic compound containing at least one hydroxyl group, at least one atom of sulphide sulphur and at least one halogen atom, said substituents being attached to different carbon atoms of a polyvalent aliphatic radical.

24. As a new product a halogen hydracid ester of a polyvalent mercaptan alcohol in which the mercaptan group is substituted in an aliphatic chain and which body contains a hydroxyl group.

25. As a new product, a halogen hydracid ester of a thioglycerine, which body contains a hydroxyl group.

26. An aliphatic organic compound soluble in alcohol and insoluble in carbon tetrachloride, containing sulphide sulphur attached to a carbon atom, halogen attached to another carbon atom, and hydroxyl attached to still another carbon atom.

27. An aliphatic organic compound soluble in alcohol and insoluble in carbon tetrachloride, containing an —SH group attached to a carbon atom, halogen attached to another carbon atom, and hydroxyl attached to still another carbon atom.

28. An organic compound which is a reaction product of a halogenhydrin containing a plurality of halogen atoms with an inorganic sulphide compound, which product is stable in the presence of water, is soluble in alcohol and is insoluble in carbon tetrachloride, and which product contains in an aliphatic chain, —SH attached to a carbon atom and halogen attached to another carbon atom.

29. As a product, an organic compound having the general formula $$H_2C-SH$$
$$HC-OH$$
$$H_2C-Ha$$

in which Ha means a halogen element.

30. As a new product, a glycerine derivative having the general formula $(C_3H_5OH)_nS_{n-1}Ha_2$ in which Ha means a halogen element, and in which "$n$" is a plural whole number, and in which both the sulphur and halogen are linked to carbon atoms.

31. An organic compound containing at least one hydroxyl group, at least one atom of sulphide sulphur and at least one halogen atom, said substituents being attached to different carbon atoms of a polyvalent aliphatic radical, and which compound is stable in the presence of water.

32. An organic compound containing at least one hydroxyl group, at least one atom of sulphide sulphur and at least one halogen atom, said substituents being attached to different carbon atoms of a polyvalent aliphatic radical, such product being purified by treatment with water and by fractional distillation in a partial vacuum.

33. A symmetrical organic compound containing at least one hydroxyl group, at least one atom of sulphide sulphur and at least one halogen atom, said substituents being attached to different carbon atoms of a polyvalent aliphatic radical, and which compound is stable in the presence of water.

34. An unsymmetrical organic compound containing at least one hydroxyl group, at least one atom of sulphide sulphur and at least one halogen atom, said substituents being attached to different carbon atoms of a polyvalent aliphatic radical, and which compound is stable in the presence of water.

35. An organic compound which is a reaction product of a halogenhydrin containing a plurality of halogen atoms with an inorganic sulphide compound, which product is stable in the presence of water, is soluble in alcohol and is insoluble in carbon-tetrachloride, and which product contains in an aliphatic chain, sulphur attached to a carbon atom and halogen attached to another carbon atom.

36. An organic compound which contains in an aliphatic chain, a sulphide sulphur atom attached to a carbon atom, a hydroxyl group attached to a carbon atom, and a halogen atom attached to a carbon atom, which compound is soluble in alcohol and insoluble in carbon tetrachloride, and is not rapidly decomposed by water.

37. An organic compound which contains, in an aliphatic chain, an —SH group attached to a carbon atom, a hydroxyl group attached to a carbon atom and a halogen atom attached to a carbon atom, which compound is soluble in alcohol and insoluble in carbon tetrachloride, and is not rapidly decomposed by water.

38. An organic compound which is a reaction product of a halogenhydrin containing a plurality of halogen atoms with an inorganic sulphide compound, which product is stable, is soluble in alcohol, and is insoluble in carbontetrachloride, and which product contains in an aliphatic chain, —SH attached to a carbon atom and halogen attached to another carbon atom, and —OH attached to still another carbon atom 39. An organic compound which is a reaction product of a halogenhydrin containing a plurality of halogen atoms with an inorganic sulphide compound, which product is stable in the presence of water, is soluble in alcohol and is insoluble in carbontetrachloride, and which product contains in an aliphatic chain, —SH attached to a carbon atom and halogen attached to another carbon atom, and —OH attached to still another carbon atom.

LEON LILIENFELD.